United States Patent
Karole

(10) Patent No.: US 10,083,108 B1
(45) Date of Patent: Sep. 25, 2018

(54) AUTOMATED STACK-BASED COMPUTERIZED APPLICATION CRAWLER

(71) Applicant: Clover Network, Inc., Sunnyvale, CA (US)

(72) Inventor: Ambarish Karole, Fremont, CA (US)

(73) Assignee: Clover Network, Inc., Sunnyvale, CA (US)

( * ) Notice: Subject to any disclaimer, the term of this patent is extended or adjusted under 35 U.S.C. 154(b) by 0 days.

(21) Appl. No.: 15/980,438

(22) Filed: May 15, 2018

Related U.S. Application Data

(60) Provisional application No. 62/599,916, filed on Dec. 18, 2017.

(51) Int. Cl.
    G06F 11/36    (2006.01)
    G06F 17/27    (2006.01)
    G06F 3/0484   (2013.01)

(52) U.S. Cl.
    CPC ...... *G06F 11/3664* (2013.01); *G06F 11/3676* (2013.01); *G06F 11/3688* (2013.01); *G06F 17/272* (2013.01); *G06F 3/04842* (2013.01)

(58) Field of Classification Search
    None
    See application file for complete search history.

(56) References Cited

U.S. PATENT DOCUMENTS

| | | | | |
|---|---|---|---|---|
| 7,356,372 | B1 * | 4/2008 | Duncan | G07C 9/00103 340/506 |
| 7,555,418 | B1 * | 6/2009 | Qadeer | G06F 11/3608 703/22 |
| 8,745,592 | B1 * | 6/2014 | Ormandy | G06F 11/3684 717/124 |
| 9,679,090 | B1 * | 6/2017 | Marolia | G06F 3/01 |
| 9,983,984 | B2 * | 5/2018 | Rahulkrishna | G06F 11/3688 |
| 2005/0251863 | A1 * | 11/2005 | Sima | G06F 21/577 726/25 |
| 2008/0244524 | A1 * | 10/2008 | Kelso | G06F 11/3664 717/124 |
| 2010/0094878 | A1 * | 4/2010 | Soroca | G06F 17/30035 707/748 |

(Continued)

OTHER PUBLICATIONS

A. Mesbah, Exposing the Hidden-Web Induced by Ajax, Delft University of Technology, 2008.

(Continued)

*Primary Examiner* — Isaac T Tecklu
(74) *Attorney, Agent, or Firm* — Daylight Law, P.C.

(57) ABSTRACT

Methods and systems related to automatically crawling an application are disclosed. One such method includes navigating to an application interface using an application crawler and a sequence of commands, analyzing the application interface to find a set of user interface elements on the application interface, determining a set of commands that will interact with the user interface elements on the application interface, and pushing each command in the set of commands onto a stack individually along with the sequence of commands. The method also comprises popping a new sequence of commands from the stack. The new sequence of commands is a command in the set of commands in sequence with the sequence of commands. The method also comprises iteratively repeating the navigating, analyzing, determining, and pushing steps with the new sequences of commands that are generated via each previous iteration of those steps.

25 Claims, 6 Drawing Sheets

(56) References Cited

U.S. PATENT DOCUMENTS

| | | | | |
|---|---|---|---|---|
| 2010/0146420 A1* | 6/2010 | Bharadwaj | ............ | G06F 3/0481 715/764 |
| 2011/0055811 A1* | 3/2011 | Ananthanarayanan | ... | G06F 8/71 717/120 |
| 2011/0239104 A1* | 9/2011 | Prasad | ................ | G06F 11/3684 715/234 |
| 2011/0283147 A1* | 11/2011 | Prasad | ................ | G06F 11/3608 714/38.1 |
| 2011/0293614 A1* | 12/2011 | Elenius | ................. | C07K 16/32 424/138.1 |
| 2012/0011489 A1* | 1/2012 | Murthy | ................ | G06F 21/577 717/126 |
| 2012/0016862 A1* | 1/2012 | Rajan | ................. | G06F 11/3684 707/710 |
| 2012/0047487 A1* | 2/2012 | Ambichl | ............ | G06F 11/3684 717/124 |
| 2013/0061209 A1* | 3/2013 | Lam | ................... | G06F 11/3672 717/123 |
| 2013/0212638 A1* | 8/2013 | Wilson | ................... | H04L 63/20 726/1 |
| 2013/0290786 A1* | 10/2013 | Artzi | ................. | G06F 11/3676 714/32 |
| 2014/0337822 A1* | 11/2014 | Puthuff | ............... | G06F 11/3636 717/125 |
| 2015/0095305 A1* | 4/2015 | Tripp | ................ | G06F 17/30864 707/709 |
| 2015/0205505 A1* | 7/2015 | Conn | .................... | G06F 3/0481 715/765 |
| 2015/0286352 A1* | 10/2015 | Gu | ...................... | G06F 3/04883 715/841 |
| 2016/0062876 A1* | 3/2016 | Narayanan | .......... | G06F 11/3684 717/130 |
| 2016/0086225 A1* | 3/2016 | Liu | ................... | G06F 17/30864 705/14.54 |
| 2016/0198045 A1* | 7/2016 | Kulkarni | ............ | H04M 3/4938 379/88.01 |
| 2016/0203072 A1* | 7/2016 | Boxall | ...................... | G06F 8/70 717/128 |

OTHER PUBLICATIONS

D. Amalfitano, et al., A GUI Crawling-based Technique for Android Mobile Application Testing, IEEE 4th ICSTW, Mar. 21-25, 2011.
P. Ast, et al., Crawler Approaches and Technology, Graz University of Technology, Nov. 2008.

* cited by examiner

```
// The App Crawler is implemented using a stack of queues data structure

BEGIN
Start Home Page Activity of the Application
while (on the same Application){

Stack1 = Stack1.push(all UI elements on the Home Page)
    while (Stack1 is not empty){ temporaryUIObject = Stack1.pop()
        Queue1 = Queue1.push(temporaryUIObject)
        clickOnUIObject(temporaryUIObject)

//now we are on the 2nd depth/page of the application
        for(each UI element on the 2nd screen){
            tempQueue1 = tempQueue1.push(temporaryUIObject)
            tempQueue1 = tempQueue1.push(new UI element on the 2nd screen)
            Stack2 = Stack2.push(tempQueue1)
        } while(Stack2 is not empty){
            Restart Home Page Activity of the Application
            tempQueue1 = Stack2.pop()
            temporaryQueue2 = tempQueue2
            while(temporaryQueue is not empty){
                clickOnUIObject (temporaryQueue.pop)
            }

//now we are on the nth depth or nth screen of the application
            //(i.e., we are on a screen n interactions away from the home page of the application)

for(each UI element on the current new screen of the application){
                Stack2 = Stack2.push(tempQueue2.addNewElementToTheTail(new UI element on the nth depth or screen))
            }
        }
    }
}

END
```

AUTOMATED STACK-BASED COMPUTERIZED APPLICATION CRAWLER

CROSS REFERENCE TO RELATED APPLICATIONS

This application claims the benefit of U.S. Provisional Patent Application No. 62/599,916, filed Dec. 18, 2017, which is incorporated by reference herein in its entirety for all purposes.

BACKGROUND

Thoroughly testing a computerized application generally requires testing every potential flow through the application. A traditional approach that meets this requirement is the creation of a suite of automated test scripts that are generated with prior knowledge of the application's desired behavior. Whenever modifications are made to the application, the suite of test scripts can be run against the application to assure that the modifications have not created a bug or fatal flaw in the system. Therefore, when modifications are made that intentionally change the desired behavior of the application, the suite of test scripts can be updated so that they properly test the application.

If many different applications need to be examined by the same testing facility, the generation of the multiple suites of test scripts needed to test all the different applications can be prohibitively time consuming. In addition, maintaining the test scripts in step with intentional changes in the requirements and desired behavior of the applications presents a difficult challenge in terms of coordinating effort between the teams that are responsible for the test scripts and those that are responsible for updating the applications. This is particularly true in situations in which different companies are responsible for testing and designing the applications. For example, one company may sell devices that facilitate the operation of a platform of software applications, while a broad base of third parties design software applications for that platform. If the company that administrates the platform takes responsibility for the stability of all applications that are available for operation on the platform, testing the applications can be difficult because the company will not have a body of prior knowledge regarding how the applications should function before the applications are received for testing.

SUMMARY

Automated application crawlers are disclosed. Automated application crawlers analyze or interact with an application without continuous guidance from a human operator. In certain situations, the automated application crawlers can explore an application without any prior knowledge of the user-flows the application is designed to facilitate. In certain situations, the automated application crawlers can serve to test the applications they crawl without the need to generate test scripts. Certain automated application crawlers disclosed herein assure that all potential user-flows are tested without any prior knowledge of what those user-flows might be.

Automated application crawlers that test applications without the need to understand the nuances of a given application ahead of time are beneficial for companies that offer third-party software through their platforms. For example, a manufacturer of a point of sale terminal that is able to run third-party applications will need to test both applications developed in house as well as third-party applications for functionality without knowing the potential user-flows of the application beforehand. In such a case, the manufacturer may know the language of the source code the software is written in, but they will not know the details of how the applications operate. As a result, the application crawler can be designed to glean information concerning the user-flows through the application using only its knowledge of the source code and the application itself. In other approaches, a testing tool will not even know, or have access to, the source code of the application. However, using approaches disclosed herein and an analysis of the views presented by the application, user interface elements in the application can be detected and tested, and the entire application can be crawled by an automated application crawler, without needing access to the source code.

In one approach a method includes navigating to an application interface using an application crawler and a sequence of commands, analyzing the application interface to find a set of user interface elements on the application interface, determining a set of commands that will interact with the user interface elements on the application interface, and pushing each command in the set of commands onto a stack individually. Each command is individually stored in the stack along with the sequence of commands. The method also comprises popping a new sequence of commands from the stack. The new sequence of commands is a command in the set of commands in sequence with the sequence of commands. The method also comprises repeating the navigating, analyzing, determining, and pushing steps with: (i) the new sequence of commands replacing the sequence of commands; (ii) a new application interface replacing the application interface; (iii) a new set of user interface elements replacing the set of user interface elements; and (iv) a new set of commands replacing the set of commands. In another approach, an application crawler is stored on a non-transitory computer-readable medium storing instructions. Execution of the instructions by one or more processors of a computer system causes the computer system to carry out the steps of the method described above.

In another approach, a method for automatically crawling an application comprises opening the application using an application crawler, analyzing a first interface of the application using the application crawler, and storing a first command in a first position in a stack and a second command in a second position in the stack. The first user interaction element and the second user interaction element were found during the analyzing of the first interface of the application. The method also comprises providing the first command to select a first user interaction element on the first interface of the application using the application crawler, and analyzing a second interface of the application using the application crawler. The second interface was presented by the application in response to the first command. The method also comprises storing the first command and a third command as a sequence in the stack. The third command is for a second user interaction element found during the analyzing of the second interface of the application. Whereby, the stack stores the sequence and the second command, and the sequence antecedes the second command in the stack.

BRIEF DESCRIPTION OF THE DRAWINGS

FIG. 6 illustrates a block of pseudo code for an application crawler in accordance with some of the approaches disclosed herein.

DETAILED DESCRIPTION

Methods and systems for automated application crawlers are disclosed. As used herein the term application refers to computerized applications. A crawler for a computerized application explores the computerized application by navigating and analyzing the application. In contrast to scripted application crawlers that are generated based on prior knowledge of the application, the application crawlers disclosed herein can crawl through an application and detect fatal errors without any knowledge of the application. Certain approaches disclosed herein utilize a stack of sequences data structure to efficiently move through the application and assure that no region of the application has been missed. These approaches build and utilize the stack of sequences while navigating the application. In certain approaches, when the stack is empty, the application has been fully examined and the test can terminate.

The methods and systems disclosed herein can be applied in such a way that they avoid pitfalls associated with blindly exploring a sequence of elements in an application such as avoiding looping paths through the application, or exiting the application entirely via a user interface element that navigates to another application. Certain approaches disclosed herein utilize direct access to the source code of the application to find user interface elements that will transition the application from one interface to the next. Certain approaches disclosed herein utilize direct access to the front-end user-interface code of the application to find user interface elements that will transition the application from one interface to the next. Certain approaches disclosed herein utilize a user interface (UI) command entry automator to test the applications and apply the commands to the application by emulating the entry of commands to the application.

Figure 1:
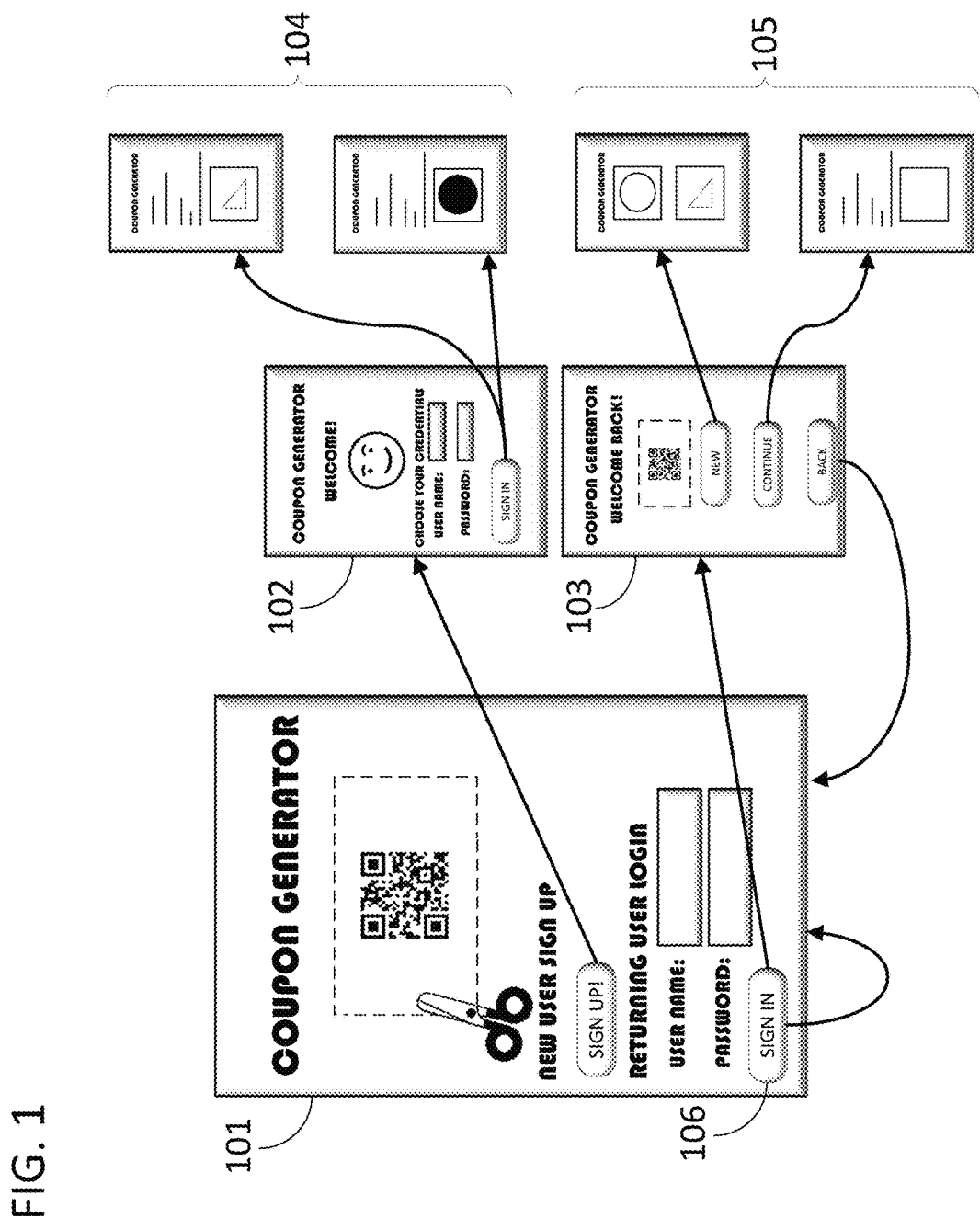
FIG. 1 illustrates a set of user interfaces in a computerized application and the user interface elements that receive commands to move through the set of user interfaces.

FIG. 1 illustrates a graphical representation of the potential paths through an application that can be taken by an application crawler. Branches through the application along user-flows are illustrated by the arrows connecting the various views of the application. For example, view 101 is a home page of the application that, based on which user interface element the user interacts with, allows a user to move to view 102 or view 103. In this case, view 102 is a sign-up page and view 103 is a member welcome page. Flows through the application continue as represented by the branches to additional views 104 and 105.

To properly test the application illustrated by FIG. 1, each illustrated branch would need to be navigated. However, this can be difficult given that the number of potential flows through the application tends to increase exponentially with the number of user interface elements on a screen and the number of different views one can navigate to from a single view. The large number of paths can make it difficult to generate and maintain a complete set of test scripts for the application. In addition, and as illustrated by the branches that lead back to view 101 from view 103 and from view 101 itself, there is the potential for an application crawler to get caught in a loop and fail to completely explore the application. Furthermore, the transition from one view to another can depend on the type of data input to a given prompt. In the illustrated case, a correct user name and password entered on view 101 will allow "SIGN IN" button 102 to navigate the application to view 103, while a set of incorrect credentials will cause "SIGN IN" button 106 to navigate the application back to view 101. The potential for the same user interface element to route the user to a different view based on the contents of another user interface element in the same view again increases the complexity of the application crawler's task by an exponential amount.

The complexities for application crawlers discussed above with respect to FIG. 1 can be addressed by a stack of sequences automated application crawler. The application crawler can move through a complete set of user-flows for an application without prior knowledge of the application. Specific approaches that utilize a stack of sequences approach are disclosed below with reference to FIGS. 2-4. The application crawler can analyze views of the application to find a set of user interface elements. The user interface elements can be a subset of the user interface elements on the view and can be limited to user interface elements that relate to navigation between different views.

User interface elements that relate to navigation between views include user interface elements that cause the application to present a new view of the application when they receive a command, and user interface elements whose state influence the navigation of other user interface elements. An example of the first category is the "SIGN IN" button in view 101 in FIG. 1. An example of the second category is the form field in view 101 that accepts a password. Both categories of elements can be referred to as navigation elements.

Once the navigation elements are identified, the application crawler can then push a set of commands for the navigation elements to a stack. The set of commands can be individually pushed to the stack with each command being appended to a sequence of commands that were used to reach the current view of the application. As used herein the term "current view" or "current interface" refers to the view that is currently, or has most recently been, analyzed to find its constituted navigation elements.

The application crawler can then pop a sequence of commands from the top of the stack and execute the sequence of commands. Once the sequence of commands has been executed, the crawler will be at a new view upon which the prior steps can be repeated. If no navigation elements are found on the current view, no new commands are pushed to the stack. Using this approach, and as can be seen with reference to FIGS. 2-3, once the stack is empty, the application will have been fully explored.

The application crawlers disclosed herein can operate with any number of computerized applications. The applications could be web applications, mobile applications (e.g., Android and iOS applications), personal computer applications, etc. In certain approaches, the application will be coded in a source code and include a manifest. However, certain application crawlers disclosed herein do not have access to the manifest and can explore the application without any prior knowledge of the application. In certain approaches, the application crawler will have direct access to parse the source code or front-end user-interface code of the application such as to determine what user interface elements can receive commands, what user interface elements are navigation elements, and to potentially find or derive global identifiers for the user interfaces and the user interface elements. The application crawler could have full or partial access to the source code of the application. The application crawler could have access to the front-end or client-side portion of an application's code. The application crawler could have access to the front-end user-interface code of the application. For example, the application crawler could have access to the user-visible frontend layout of an Android application in .xml format or the frontend layout of a web application in .html format. However, the application crawler could also not have access to any of the code of the application and utilize image processing techniques to identify user interface elements in the user interfaces of the application.

Figure 2:
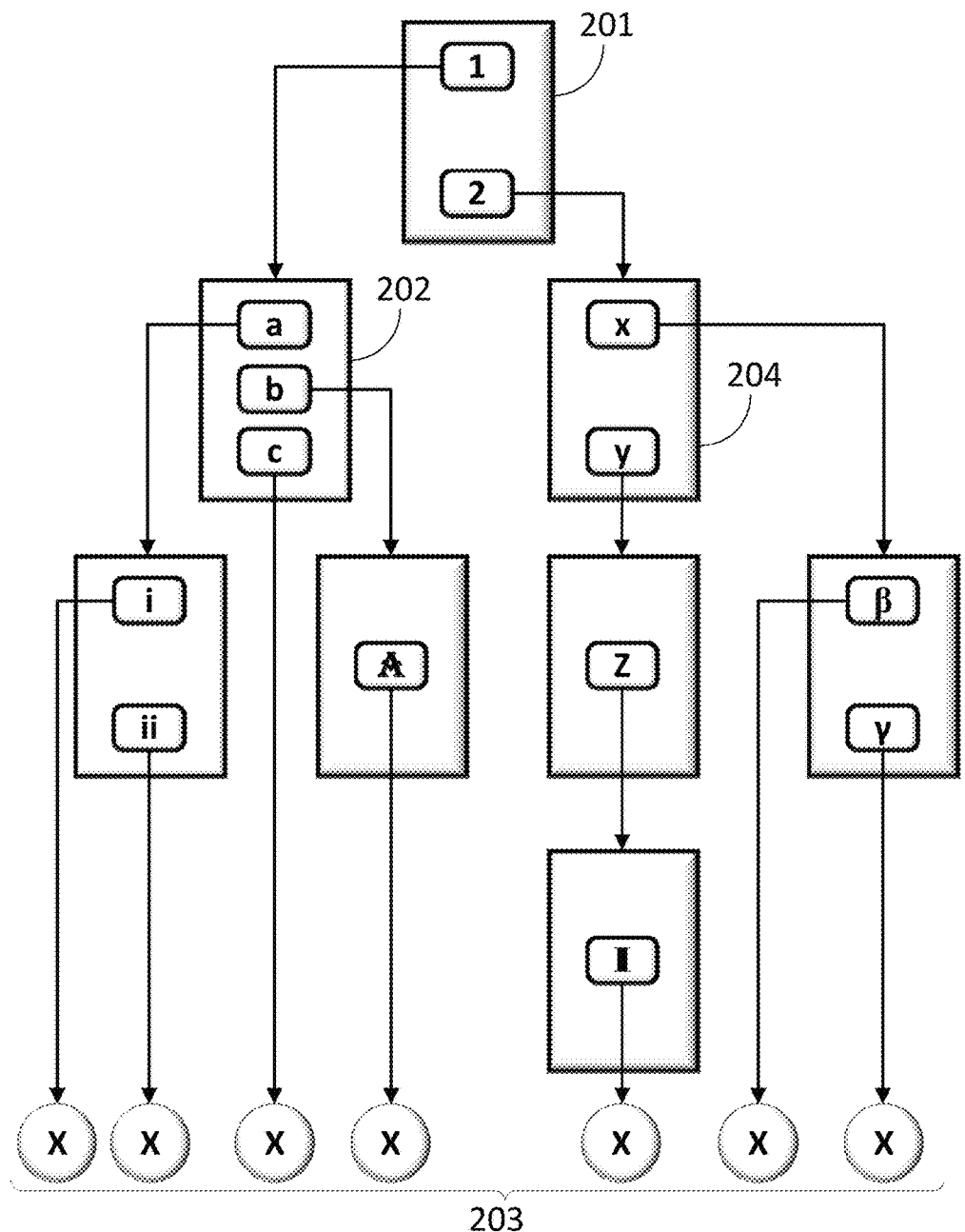
FIG. 2 illustrates a block diagram for a set of flows through the views of a computerized application and the user interface elements that receive commands to move through the application as driven by a stack-based application crawler in accordance with some of the approaches disclosed herein.

FIG. 2 illustrates a block diagram 200 for a set of flows through a computerized application. The views of the application include home page 201, which includes two navigation elements (i.e., button "1" and button "2"). Flows that are triggered by the delivery of a command to a user interface element are illustrated by arrows extending from the user interface element and terminating at the view of the application that is provided in response to the command. For example, pressing navigation button "1" will cause the application to present view 202. The set of termination views 203 are provided at the bottom of the diagram and represent the final views that are provided at the termination of the 7 potential flows through the application. The application in FIG. 2 is simple in construction for purposes of illustrating the operation of a stack of sequences application crawler. For example, the application does not have any loops and does not have any navigation elements that alter the views to which they navigate based on the state of other user interface elements or the value of any variables in the application. Furthermore, application state variables set on one view do not effect navigation on another view. However, these aspects of more complex applications can be addressed with additional techniques as described in more detail below.

Figure 3:
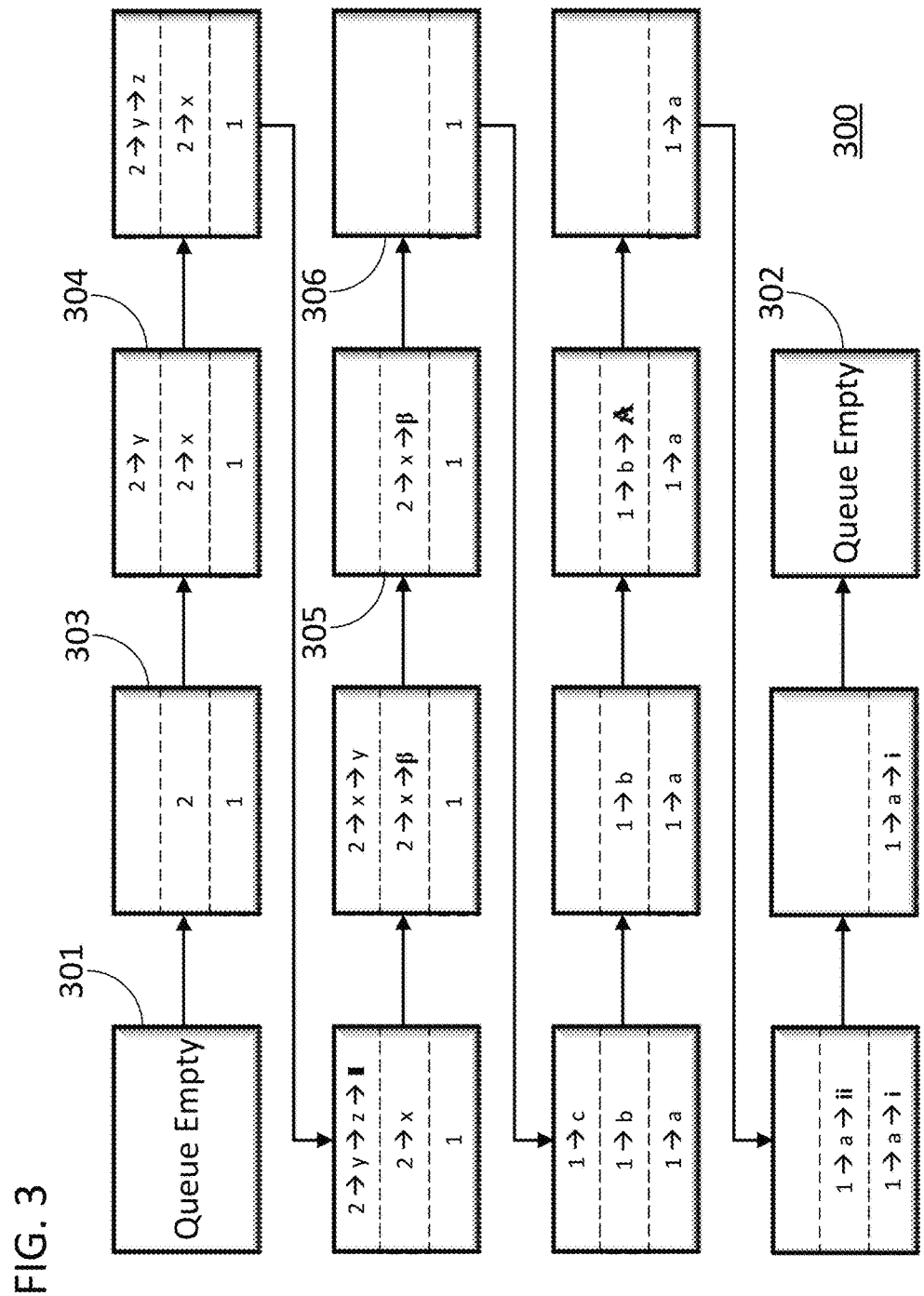
FIG. 3 illustrates the contents of a stack as a stack-based application crawler analyzes and crawls the computerized application represented by the block diagram in FIG. 2.

FIG. 3 illustrates a flow chart 300 illustrating the contents of a stack as an application crawler analyzes and crawls the computerized application represented by the user interfaces in the block diagram of FIG. 2. The stack can be provided in the working memory of a terminal and can be instantiated and managed by the application crawler. The stack begins in an empty state 301 and terminates in empty state 302. In the intermittent states, the stack stores one or more sequences of commands. The sequences can include a single element, as in state 303, where a first sequence includes single element "2" and a second sequence includes single element "1." In this illustration, the elements of the stack are commands provided to the identified user interface elements. For example, in state 303, element "2" refers to a command that can be provided to user interface element "2" in view 201 to cause the application to display view 204. If user interface elements 1 and 2 were buttons, the commands stored in the stack of state 303 could be a click or touch command directed to those buttons.

Figure 4:
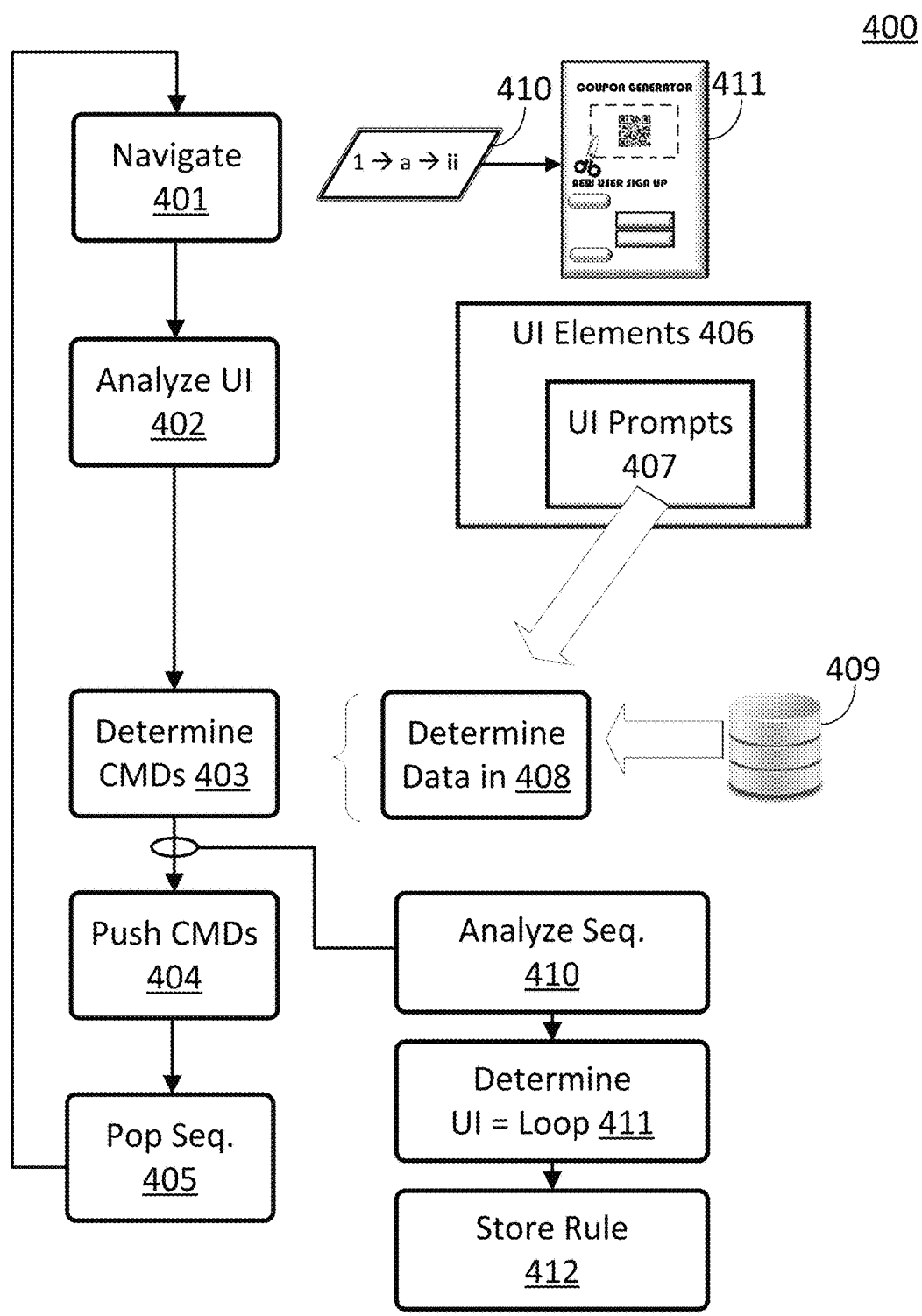
FIG. 4 illustrates a flow chart for a set of methods for crawling an application in accordance with some of the approaches disclosed herein.

Two consecutive arrows along flow chart 300 can include the execution of steps 401-405 in FIG. 4 by an application crawler operating in combination with the application. For example, the transfer from state 301 to 303 can involve navigating to view 201, analyzing view 201 to find user interface elements "1" and "2," determining the commands that can be provided to those user interface elements to cause the application to flow from view 201 to either view 202 or view 204, and pushing those commands to the stack. Upon completion of those steps, the stack would be in state 303, and include two sequences with commands "2" and "1" stacked consecutively in the stack. The transfer from state 303 to 304 can involve popping command "2" off the stack, and another iteration of the steps provided above in which view 204 becomes the current view and is analyzed in the same manner as before. In this next iteration of steps 401-405, the newly discovered commands "y" and "x" are pushed to the stack in combination with the sequence of commands that allowed the crawler to navigate to the current view (i.e., view 204). When a termination view is reached, the process does not need to be altered, as there are simply no commands to add to the stack, and the top sequence can be popped from the stack to continue the processes. A review of the remaining state transitions in FIG. 3 in relation to application flow chart 200 illustrates how the continued execution of this process results in the complete exploration of all 7 flows and termination views.

FIG. 4 includes flow chart 400. The flow chart provides a set of methods for automatically crawling an application. Flow chart 400 includes a step 401 of navigating to an application interface using an application crawler and a sequence of commands. Step 401 will be executed multiple times as the application crawler crawls through the views of the application. When step 401 is initially executed, the step can involve starting the application and opening a first view of the application, such as a home screen of the application. However, this step can also involve applying a sequence of commands 410 to the application 411 to navigate through a flow of the application.

A UI command entry automator can be used to emulate the entry of commands to the application by a user to facilitate the execution of step 401. The commands can each navigate to a different view of the application in sequence and can be provided by the UI command entry automator to the application in steps with a predetermined amount of time spaced between each command to allow the application to present a new view. However, the commands can also be delivered upon receipt by the UI command entry automator of an event indicating that the application has loaded a view. For example, if the application were a web application, the HTML DOM onload event could be used by an event listener in the UI command entry automator waiting to deliver the next command in the sequence. The commands could also be provided to user interface elements that effect navigation without directly causing the application to navigate such as by delivering data to a user interface element. The application interface can be a screen of the application, a window of the application, a sub window of the application, a page of a web application, a form of a web application, or any other view or sub view associated with the operation of an application and its interaction with a user. The application interface can also be displayed in an Android View object or an HTML DOM page object.

Flow chart 400 continues with a step 402 of analyzing the application interface to find a set of user interface elements on the application interface. Step 402 can be conducted after every command in a sequence of commands 410 has been executed. The resulting application interface that is presented by the user can be referred to as the "current" interface for a given iteration of steps 401-405. The execution of step 402 can involve an analyzer of the application crawler analyzing the source code of the application. The execution of step 402 can also involve an analyzer of the application crawler analyzing an image of the application view and using image processing techniques and a library of possible user interface elements. The user interface elements can include text input fields, radio buttons, stand-alone selection buttons, check boxes, drop down menus, or any other kind of object that can receive commands or effect navigation through an application. The user interface elements can also be text fields instructing the user to interact with user interfaces besides the actual application interface themselves. For example, a user interface could be a text field saying: "swipe credit card" instructing the user to interact with an electronic credit card reader. These prompts would be analyzed in step 402 along with the user interface elements on the application interface that directly receive inputs from the user.

In a specific implementation, a customized function can be used to identify and uniquely identify the user interface elements on the page. The unique identifier can include any text on the user interface element, as it appears in the view, as well as other data associated with the user interface element. In approaches in which the application crawler does not have access to the code of the application, image processing techniques can be used to generate a unique identifier such as be concatenating the hex code for the main color of the user interface with a value for the surface area of the element and the text contained in the element. Any combination of data regarding the physical appearance of the element can be used for this purpose. In approaches in which the application crawler has access to the code of the application, such as the front-end user-interface code of the application, data can be extracted from the encoding of the element to generate the unique identifier for the element.

In a specific implementation in which the application is an Android application, a specialized class for the unique identifiers can be built using the Android UI Automator class UiObject. Specifically, a "ClickObject" class can be instantiated with two member variables of datatype: UiObject and String, and their respective getter and setter functions. The ClickObject can combine the UiObject's getText( ) function, which returns the text value displayed by a UI element, with another function that obtains a portion of the XML code for the UI element. The text value displayed by the UI element and the portion of the XML code can then be concatenated to create a unique identifier for the UI element that is more likely to be unique than the text value displayed by the UI element alone. The definition of the ClickObject Class is as follows:
  public class ClickObject {
  UiObject uiObject;
  String uiObjectText;
  public String getUiObjectText( ){. . . }
  public void setUiObjectText(String uiObjectText) {. . . }
  public UiObject getUiObject( ){. . . }
  public void setUiObject(UiObject uiObject) {. . . }
  }
  The ClickObject can be instantiated using the following code:
  ClickObject clickObjectOnPage=new ClickObject( )
  text=objButton.getText( )+objButton.getContentDescription( )
  clickObjectOnPage.setUiObjectText(text);
Assuming a basic case of an Android button with object name "SetupButtonMenuBar" which actually displays the text "Setup" in a view of the Android application to which it is instantiated, the Android UI Automator class UIObject getText( ) function would return "Setup" while ClickObject's getUIObjectText( ) would return: "SetupButtonMenuBarSetup." As seen, ClickObject is more likely to generate a truly unique identifier for a UI object than UIObject.

In certain approaches, a view of the application will be dynamic such that not all user interface elements are constantly located on the page. Android "fragments" are an example of this kind of functionality. In some approaches disclosed herein, each dynamic view of that single view will be treated like a separate view of the application. In other approaches, a constant check can be conducted using a method that repeatedly polls a view to detect and uncover dynamic elements. In a specific implementation in which the application is an Android application, an example of this kind of method is provided in the following pseudo code. The function is getUniqueStringElementsPresentInFirstObject and it allows for the capture of all unique new items on an Android page even if it is dynamic. This ensures that if a new user interface element presents itself, it will be added to the application crawler's stack.

```
//get unique elements present in the new page
public List<String> getUniqueStringElementsPresentIn-
FirstObject(List<ClickObject>page2Obj, List<ClickObject>
homePageObj) throws UiObjectNotFoundException,
InterruptedException {
    List<String> obj3 = new ArrayList<String>( );
    for (int i = 0; i < page2Obj.size( ); i++) {
      int flag = 0;
      for (int j = 0; j < homePageObj.size( ); j++) {
    if (!(page2Obj.get(i).getUiObjectText( ).equals(home-
PageObj.get(j).getUiObjectText( )))) {
        flag++;
      }
    }
    if (flag == homePageObj.size( )) {
      Obj3.add(page2Obj.get(i).getUiObjectText( ));
    }
  }
  return obj3;
}
```

The function disclosed above, and equivalents, can also be used to double check if the application crawler has successfully crawled to a new page. Each time the crawler presses a button or renders an interaction with a UI element, the elements of the view can be captured and compared with the elements obtained from running the same routine prior to interacting with the UI element. If the UI elements captured by this function, or its equivalents, are the same, then the crawler will be able to determine that an error occurred and it has not actually navigated away from the last view as expected.

In certain approaches, the execution of step 402 will also involve determining if an interface has been previously analyzed. In certain approaches, prior executions of step 402 will store information that identifies the interface after the interface has been analyzed. For example, a hash of application data could be used to specifically identify user interface elements and could be stored in memory for this purpose. The hash could be generated from an overall appearance of the interface, such as by transforming the interface to an image and generating a hash from the image data. Alternatively, in approaches in which the crawler has access to the underlying source code or front-end user-interface code, a unique page identifier such as a URL for a web page in a web application or a View object name in an Android application, can be stored as the identifier. In the example of an Android application being crawled, if a function such as UIObject getText( )has been used on a page of an application, the page can also be identified by concatenating the unique identifiers for all the elements on the page as obtained by that function. In later executions of step 402, the stored identities of previously analyzed interfaces can be compared against the analysis of the current page. These processes will help to identify loops in the application and derive how interface elements effect the navigation of other interface elements as will be described below.

In certain approaches, the execution of step 402 will also involve determining if an interface is a termination view. The execution of this process can involve scanning the interface to determine if any user interface elements are located in the interface that result in the application navigating from one view to another. If no such user interface elements exist, the interface can be considered a termination view and no command needs to be added to the stack. Such a situation is illustrated by the transition between states 305 and 306 in FIG. 3, in which a sequence is popped from the stack, and subsequently executed, but no additional sequences are added to the stack. The identification of an interface as a termination view can be combined with approaches in which information is stored concerning prior interfaces that have been visited. For example, the fact that an interface is a termination view can be stored along with an identifier for the interface as described above. Subsequently, if the application crawler navigates to an interface, and identifies the interface as a termination view based on prior analysis, then there may be no need to analyze the view for user interface elements.

Flow chart 400 continues with a step 403 of determining a set of commands that will interact with the user interface elements on the current application interface. This step can involve accessing a stored library of commands and test data using an identification of the various user interface elements found in step 402 as the lookup values. The stored library of commands could include complex values or entire scripts. For example, if a user interface element was identified as a radio button with four options, the library could return four different commands equivalent to a selection of each of the four options. The commands can include text input commands, touch commands, scroll commands, directional commands, mouse down commands, mouse click commands, gesture commands, and any other kinds of command that a user can utilize to interact with the interface of an application. In certain approaches, the commands will also include interactions with peripherals of the system instantiating the application that are not applied to any particular user interface element on the current interface, but may be associated with a user interface element on the current interface. For example, a user interface element in the form of a prompt stating: "swipe credit card" or "apply finger print to scanner" could be presented on the screen, and the command determined in step 403 would be the emulated entry of the associated information via the particular user interface involved (e.g., the entry of a test credit card number to the application via a UI command entry automator).

Either of steps 402 and 403 can involve selecting a subset of the total number of user interface elements on the screen as the set of user interface elements for which commands need to be applied based on a determination as to whether each user interface element on the screen was a navigation element. If it was determined that a user interface element did not affect navigation, then the user interface element could be ignored for purposes of completing steps 403 and executing step 404. This determination could be made in various ways. For example, the UI command entry automator could utilize trial and error to check all of the different potential combinations of commands that could be provided to the interface, examine the applications response to each, and mark the user interface elements that contributed to navigation as the set of user interface elements to utilize for later steps in the process. As another example, if the application crawler had access to the source code or front-end user-interface code of the application, the crawler could find user interface elements with page load event handlers, HTML links, or equivalent data to find the navigation options from the user interface and mark any user interface element that could fire the associated events or select those links as navigation elements. In a second interaction, the crawler could then analyze the source code or front-end user-interface code for any user interface element in the current view that would affect variables used by those event handlers, HTML links etc. and mark those user interface elements as navigation elements. This process includes parts of both of steps 403 and 402 and will also include its own processes as it can involve both finding the user interface elements and determining what kinds of commands the user interface elements accept, as well as determining the effect those commands will have on the application. The subset of elements selected in either of steps 402 and 403 can also be conducted in light of a selection process that prevents commands from being applied to navigation elements that would navigate outside of the application. For example, links to external applications or web pages could be identified via a review of the link's content and the application crawler could mark any associated interface element as excluded from the process of step 403 or 404.

Flow chart 400 continues with a step 404 of pushing each command in the set of commands found in step 403 onto a stack. The commands are pushed onto the stack individually. In some approaches, when they are pushed onto the stack, they are stored along with a sequence of commands that allows for navigation to the current interface. The commands can be appended to the sequence as they are stored. With reference to states 303 and 304 in FIG. 3, the set of commands comprising "y" and "x" have been stored individually in the stack in sequence with the command "2" which would allow the application crawler to navigate from a home screen of the application to the current view and then subsequently execute one of the commands in the set of commands. The stack can be instantiated in a working memory that is accessible to the application crawler. The stack can be a last-in-first-out stack (LIFO). The stack can operate in combination with pop and push commands in which elements are respectively added to or removed from a primary position in the stack while the stack is respectively incremented or decremented by one unit in total size.

Flow chart 400 continues with a step 405 of popping a new sequence of commands from the stack. In certain approaches, the new sequence of commands will be the last command from the set of commands found in step 403 in sequence with a sequence of commands needed to navigate to the current interface. With reference to state 304, the new sequence of commands will be "2–>y." In certain approaches, the new sequence of commands is a command in the set of commands from step 403 in sequence with the sequence of commands used to navigate to the current view in step 401. The new sequence of commands can then be used in another iteration of step 401, as seen by the arrow looping back to the top of flow chart 400. The application crawler, and optional UI command entry automator, can be designed to request the instantiation of the application's home or start screen as part of each execution of step 401. In other words, after executing steps 402-405 while the application is on a current interface, the application can be reset to the home screen because the sequence of commands are configured to navigate from the home screen to the next interface to be explored.

The flow chart can continue with additional iterations of the loop comprising steps 401-405. In the next iteration, a new sequence of commands will be utilized in step 401, a new application interface will become the current interface, a new set of user elements will be analyzed in step 402, and a new set of commands will be determined in step 403. The loop will continue to execute until there are no longer any commands to pop from the stack in step 405. The test will then be complete. Data from the executions of flow chart 400 can be used to analyze the results. For example, the sequence of commands can be stored after they are executed to illustrate all the flows that the application crawler utilized. The sequences can be filtered automatically to only include sequences that lead to a termination view. An evaluation of the number of such sequences could provide a quick quality control check on how well the application crawler did at crawling the application.

A user interface can be analyzed in different ways depending upon how much access to the application the application crawler has, and what kind of application is being crawled. As mentioned previously, access to the source code is not required as the application crawler can analyze the page to identify user interface elements and associated commands using image processing techniques. However, certain benefits accrue to approaches in which the application crawler does have access to the source code in that knowledge of the source code can be used to efficiently identify which user interface elements are located on a given view using a lookup table of code elements that are utilized by such user interface elements. For example, if the application were a web application and the crawler had access to the source code of the application, user interface elements could be identified by parsing the source code for HTML tags in the source code that were indicative of user interface elements. In these approaches, step 402 of FIG. 4 could involve parsing the front-end portion of the web application's source code using a list of HTML tags that provide interactivity. The associated execution of step 403 could parse the front-end portion of the web application's source code for event listeners with event handlers used to navigate the application. As another example, if the application were a Java or Android application and the crawler had access to the source code or front-end user-interface code of the application, the source code or front-end user-interface code could be parsed using the UiSelector class. In these approaches, step 402 of FIG. 4 could involve parsing a front-end portion of the source code or front-end user-interface code using the UiSelector class to find a set of user interface elements on the user interface that can be selected.

Two specific classes of user interface elements that can be used by the application crawlers of this disclosure are: user interface prompts and user data input interface elements. User data input interface elements are user interface elements that accept input from the user and that have an indirect effect on page navigation. For example, the "user name" form field in FIG. 1 had an effect on where the "SIGN IN" button would take the user in that if a correct user name was provided, the application would flow to interface 103 and if an incorrect user name was provided, the application would instead refresh interface 101. User interface prompts are associated with a user data input interface element and describe what type of input should be provided. For example, the text "User Name" is a user interface prompt associated with the user data input interface elements that is the form field which actually accepts the user name from a user. Analyzing the application to find a set of user interface prompts can be executed simultaneously with step 402 or as a separate step. For example, parsing an HTML input tag within an HTML form tag with the syntax: "First name: <input type="text" name=fname">provides both the prompt "First name" and the command type "text" associated in a readily determinable way based off of prior knowledge of the source code language as opposed to prior knowledge of the application. Regardless, FIG. 4 illustrates the relationship between user interface elements 406 and user interface prompts 407 in that user interface prompts are a part of the broader class of user interface elements generally.

In the case of user data input prompts, finding an acceptable command that will affect navigation through the application is slightly more challenging than in the case of a basic user interface element such as a button because there is generally only one thing you can do with a button as compared to the large number of different data inputs that can be provided to a text prompt. As such, the step of determining commands to provide to the user interface elements in FIG. 4 can also include a step 408 of determining, using the set of user interface prompts 407, a set of user data inputs that will be accepted by the set of user data input interface elements. This process can be used in combination with a lookup table and a database of stored test data 409. The test data be in the form of credit card numbers, first names, last names, passwords etc. The look up table can include a list of common prompts for such data and be associated with such data in a many-to-one arrangement.

The process of flow chart 400 can be augmented to prevent looping through an application using certain approaches. For example, the alternative process outlines by steps 410-412 could be inserted between the execution of steps 403 and 404. In step 410, a sequence of commands in the stack could be analyzed. The sequence could be analyzed against previous sequences stored in the stack or previously executed by the stack. During this analysis, a sequence of commands in the most recent sequence of commands generated for addition to the stack could be found to already exist within the stack. To facilitate this analysis, each command could be stored with an identifier of the interface element to which it was delivered. During the analysis of step 410, a user interface element in the analyzed sequence could be determined to be a looping user interface element. In response to this determination, the application crawler could execute step 412 in which a rule is stored to prevent pushing any command directed to the looping user interface element to the stack. This list of rules would then need to be accessed prior to each iteration of step 404. Notably, sequences that involved the user interface element that were already stored in the stack would still be executed, the user interface element would just not be utilized in further iterations of step 404.

In a particular approach, step 410 would analyze the most recent commands obtained in step 403, and determining if any of them had ever been issued previously and stored in the stack. If such a command was found, the user interface element that received the last command in the most recent execution of step 401 would be identified as the looping user interface element. As mentioned previously, user interfaces can be specifically distinguished at the application-level using identifiers in the source code of the application, or an analysis and hash of the visual appearance of the application. The user interface identifiers can then be used to keep track of commands for purposes of the executions of step 410.

An alternative method for detecting if a looping condition has occurred involves a process conducted at step 401 in which a page being navigated to is analyzed to determine if it has been visited before. The process can be applied in approaches where a unique identifier for each view of the application is stored for later comparison. The unique identifier can be any of the variants discussed above including a hash of an image file of the view. Alternatively, the unique identifier can be a concatenated string of the unique identifiers of the user interface elements on the page. The user interface element unique identifiers can be appended to the string in any set order so long as it is consistent for each view. For example, the strings can be appended to the unique identifier for the page in a top-down and left-to-right order, an outside-in order, or some other order. A routine can then be run each time a new view is navigated to in step 401 to compare the unique identifier for the page with a collection of stored unique identifiers for previously visited pages. The following pseudo code could implement this approach analyzing a page to see if it has been navigated to previously in the same chain of commands. The following "compare ClickObjects" function compares a list of all ClickObjects on a new page of an Android application and a collection of pages that were previously evaluated. If the method returns "true" then both pages are the same, and the system can flag a loop condition. The current iteration of step 401 can then be terminated to break the loop.

```
// compareClickObjects(clickObjects2, clickObjectsHome);
//method to Compare two Objects are equal:
public boolean compareClickObjects(List<ClickObject>
page2Obj, List<ClickObject> homePageObj) throws
UiObjectNotFoundException {
    int flag = 0;
    if (page2Obj.size( ) ! =homePageObj.size( )) {
        return false;
    } else {
        for (int i = 0; i < page2Obj.size( ); i++) {
            for (int j = 0; j < homePageObj.size(); j++) {
                if (page2Obj.get(i).getUiObjectText().equals(home-
PageObj.get(j).getUiObjectText( )))
                // comparing each String element of the two Lists
                    flag++;
        } }
        if (flag == page2Obj.size( )) {
            return true;
        } else {
            return false;
        } }
```

Figure 5:
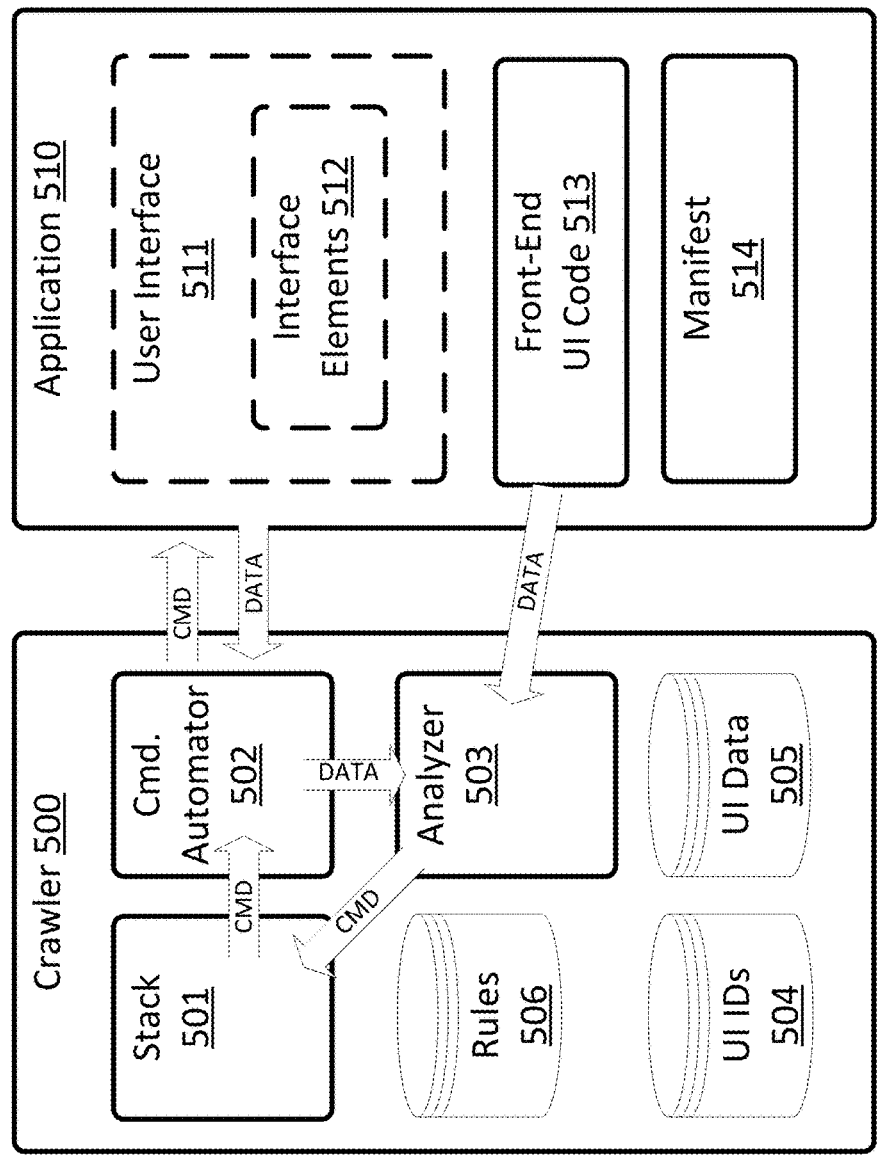
FIG. 5 illustrates a block diagram of a computerized system for crawling an application in accordance with some of the approaches disclosed herein.

FIG. 5 illustrates a block diagram of a computerized system for crawling an application. The blocks include instructions and data that can be stored in computer readable media such as in random access memory or in nonvolatile memory. The instructions can be utilized by a processor to execute any of the methods disclosed herein and to instantiate the software modules illustrated in the diagram. The block diagram illustrates application crawler 500 along with application 510. Application crawler 500 includes stack 501, UI command entry automator 502, and analyzer 503.

UI command entry automator 502 can include the software and supporting hardware required to emulate the provisioning of commands to application 510 and the receipt of responsive data from application 510. In particular, UI command entry automator 502 can execute user interface inputs to user interface elements 512 in application 510. Furthermore, the navigating step 401 in FIG. 4 can be conducted by UI command entry automator 502 executing user interface inputs to the application that correspond with commands in the sequence of commands. The UI command entry automator can also provide emulated inputs to application 510 through other channels that do not involve user interface 511 such as a finger print reader, magnetic stripe reader, chip card reader, or some other peripheral that provides data to application 510.

Stack 501 can include the stack utilized in FIG. 4 above to store sequences of commands for exploring application 510. In particular, application crawler 500 can pop commands from stack 501 for execution by UI command entry automator 502 in order to navigate the application. Stack 501 can also include the software and supporting hardware required to administrate access to the stack.

Analyzer 503 determines commands for addition to stack 501 to effectively crawl application 510 in accordance with the methods disclosed herein. Analyzer 503 can include the software and supporting hardware required to evaluate the user interface elements 512 in user interface 511 of application 510 to determine which user interface elements are navigation elements, and to determine what commands should be applied to the application. The analyzer can receive data from UI command entry automator 502 regarding the user interface elements 512. In certain approaches, the analyzer can also analyze and obtain data from the front-end user-interface code of the application 513 regarding the user interface elements 512 and other interfaces for providing commands to application 510.

Crawler 500 can also include data to facilitate additional features of the application crawler described above. For example, crawler 500 can include a table of user interface identifiers 504 and a collection of user interface data 505. The user interface identifiers 504 can be used by analyzer 503 to determine what user interface elements are described by the data received from the front-end user-interface code 513 or UI command entry automator 502. Once the user interface elements are identified, analyzer 503 can retrieve user interface data from the collection of user interface data 505 according to the requirements of the identified user interface elements. For example, the analyzer could receive data with a user interface prompt with the text "CC#" and use user interface identifiers 504 to recognize that the prompt was asking for a credit card number. That information in turn could be used by analyzer 503 to pull a sample credit card number from user interface data 505. Analyzer 503 would then create an input data command using that data and push the command to stack 501. As another example, crawler 500 can include a list of rules 506 that are administrated by the analyzer. The rules could be the list of rules described above that identify user interface elements as looping user interface elements. Analyzer 503 could then check a generated command against rules 506 to determine if crawler 500 should abstain from pushing an associated command onto stack 501 to prevent application crawler 500 from looping through application 510.

Application 510, along with user interface 511 and user interface elements 512, can be instantiated by a processor and a memory with access to the front-end user-interface code of the application 513. Application 510 can be augmented with APIs to communicate with crawler 500. Furthermore, a copy of the front-end user-interface code of the application 513 can be accessible to analyzer 503, and the code can be parsed ahead of time before UI command entry automator 502 begins to communicate with application 510. Application 510 can also include a manifest 514 that is packaged with the front-end user-interface code of the application 513. However, application crawler 500 does not need to have access to manifest 514 to effectively crawl application 510 in accordance with approaches in this disclosure.

FIG. 6 provides a block of pseudo code 600 for an implementation of a method from flow chart 400. Pseudo code 600 utilizes common coding conventions including the use of parentheses to identify conditions for "for" and "while" loops and curly brackets to identify the code that is execute through an iteration of those loops. Pseudo code 600 additionally utilizes dot notation such that "stackl.push(X)" indicates that the output of the function "push" with input (X) should be applied to the object "stackl." Pseudo code 600 refers to the views of the application that are presented in series as the "nth depth" or "nth page" to indicate that a path through the user experience of the application will include "n-1" prior pages before reaching the view that is presented at the nth depth.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device, a workstation, or a network accessible memory. Although examples in the disclosure were generally directed to a testing environment analyzing Android or Web applications, the approaches could can be directed to a testing environment for analyzing any computerized application. Although examples in the disclosure were generally directed to application crawlers that explore applications for testing purposes, the approaches disclosed herein can be applied to computerized applications for all purposes including data retrieval and indexing. These and other modifications and variations to the present invention may be practiced by those skilled in the art, without departing from the scope of the present invention, which is more particularly set forth in the appended claims.

What is claimed is:

1. A method for automatically crawling an application, comprising:
    navigating to an application interface using an application crawler and a sequence of commands;
    analyzing the application interface to find a set of user interface elements on the application interface;
    determining a set of commands that will interact with the user interface elements on the application interface;
    pushing each command in the set of commands onto a stack, individually, whereby each command is individually stored in the stack along with the sequence of commands;
    popping a new sequence of commands from the stack, wherein the new sequence of commands is: a command in the set of commands in sequence with the sequence of commands; and
    repeating the navigating, analyzing, determining, and pushing steps with: (i) the new sequence of commands replacing the sequence of commands; (ii) a new application interface replacing the application interface; (iii) a new set of user interface elements replacing the set of user interface elements; and (iv) a new set of commands replacing the set of commands.

2. The method of claim 1, wherein:
    the application is coded in a source code and includes a manifest; and
    the application crawler does not have access to the manifest.

3. The method of claim 1, wherein:
    the application crawler has a user interface command entry automator to execute user interface inputs to the application; and
    the navigating step is conducted by the UI command entry automator executing user interface inputs to the application that correspond with commands in the sequence of commands.

4. The method of claim 1, further comprising:
    analyzing the application interface to find a set of user interface prompts on the application interface, wherein the set of user interface prompts are associated with a set of user data input interface elements in the set of user interface elements;
    wherein determining the set of commands that will interact with the user interface elements includes determining, using the set of user interface prompts, a set of user data inputs that will be accepted by the set of user data input interface elements.

5. The method of claim 1, further comprising:
    analyzing a second new sequence of commands wherein the second new sequence of commands is: a new command in the new set of commands in sequence with the new sequence of commands;
    determining that a new user interface element in the set of new user interface elements is a looping user interface element during the analyzing of the second new sequence of commands; and
    storing a rule that prevents pushing any commands directed to the looping user interface element to the stack.

6. The method of claim 1, wherein:
    the stack is a last in first out stack;
    the set of commands include one of: a mouse down command and a touch command;
    the set of user interface elements include a button; and
    the application interface is a view of the application.

7. The method of claim 1, wherein:
    the application is coded in a source code
    the application is a web application;
    the set of user interface elements are defined by hypertext markup language tags in the source code;
    the application crawler has direct access to parse a front end of the application; and
    analyzing the application interface to find a set of user interface elements includes parsing a .xml layout of the application.

8. The method of claim 7, further comprising:
    analyzing the application interface to find a set of user interface prompts on the application interface, wherein the set of user interface prompts are associated with a set of user data input interface elements in the set of user interface elements;
    wherein determining the set of commands that will interact with the user interface elements includes determining, using the set of user interface prompts, a set of user data inputs that will be accepted by the set of user data input interface elements;
    wherein analyzing the application interface to find the set of user interface prompts includes parsing the .xml layout of the application.

9. The method of claim 1, wherein:
the application is coded in a source code and includes a manifest;
the application crawler does not have access to the manifest; and
the application is an Android application;
the set of user interface elements are widgets;
the application crawler has direct access to parse a front end of the application; and
analyzing the application interface to find the set of user interface elements includes parsing the front end portion of the application using the UiSelector class.

10. The method of claim 9, wherein:
the stack is a last in first out stack;
the set of commands include a set of events;
the set of user interface elements include a set of event listeners; and
the application interface is displayed in a View object.

11. An application crawler stored on a non-transitory computer-readable medium storing instructions, wherein execution of the instructions by one or more processors of a computer system causes the computer system to carry out the steps of:
navigating to an application interface using an application crawler and a sequence of commands;
analyzing the application interface to find a set of user interface elements on the application interface;
determining a set of commands that will interact with the user interface elements on the application interface;
pushing each command in the set of commands onto a stack, individually, whereby each command is individually stored in the stack along with the sequence of commands;
popping a new sequence of commands from the stack, wherein the new sequence of commands is: a command in the set of commands in sequence with the sequence of commands; and
repeating the navigating, analyzing, determining, and pushing steps with: (i) the new sequence of commands replacing the sequence of commands; (ii) a new application interface replacing the application interface; (iii) a new set of user interface elements replacing the set of user interface elements; and (iv) a new set of commands replacing the set of commands.

12. The application crawler of claim 11, wherein:
the application is coded in a source code and includes a manifest; and
the application crawler does not have access to the manifest.

13. The application crawler of claim 11, wherein:
the application crawler has a user interface command entry automator to execute user interface inputs to the application; and
the navigating step is conducted by the UI command entry automator executing user interface inputs to the application that correspond with commands in the sequence of commands.

14. The application crawler of claim 11, wherein the method further comprises:
analyzing the application interface to find a set of user interface prompts on the application interface, wherein the set of user interface prompts are associated with a set of user data input interface elements in the set of user interface elements;
wherein determining the set of commands that will interact with the user interface elements includes determining, using the set of user interface prompts, a set of user data inputs that will be accepted by the set of user data input interface elements.

15. The application crawler of claim 11, wherein the method further comprises:
analyzing a second new sequence of commands wherein the second new sequence of commands is: a new command in the new set of commands in sequence with the new sequence of commands;
determining that a new user interface element in the set of new user interface elements is a looping user interface element during the analyzing of the second new sequence of commands; and
storing a rule that prevents pushing any commands directed to the looping user interface element to the stack.

16. The application crawler of claim 11, wherein:
the stack is a last in first out stack;
the set of commands include one of: a mouse down command and a touch command;
the set of user interface elements include a button; and
the application interface is a screen of the application.

17. The application crawler of claim 11, wherein:
the application is coded in a source code
the application is a web application;
the set of user interface elements are defined by hypertext markup language tags in the source code;
the application crawler has direct access to parse a front end of the application; and
analyzing the application interface to find a set of user interface elements includes parsing a .xml layout of the application.

18. The application crawler of claim 17, further comprising:
analyzing the application interface to find a set of user interface prompts on the application interface, wherein the set of user interface prompts are associated with a set of user data input interface elements in the set of user interface elements;
wherein determining the set of commands that will interact with the user interface elements includes determining, using the set of user interface prompts, a set of user data inputs that will be accepted by the set of user data input interface elements;
wherein analyzing the application interface to find the set of user interface prompts includes parsing the .xml layout of the application.

19. The application crawler of claim 11, wherein:
the application is coded in a source code and includes a manifest;
the application crawler does not have access to the manifest; and
the application is an android application;
the set of user interface elements are widgets;
the application crawler has direct access to parse a front end of the application; and
analyzing the application interface to find the set of user interface elements includes parsing the front end portion of the application using the UiSelector class.

20. The application crawler of claim 19, wherein:
the stack is a last in first out stack;
the set of commands include a set of events;
the set of user interface elements include a set of event listeners; and
the application interface is displayed in a View object.

21. A method for automatically crawling an application comprising:

opening the application using an application crawler;
analyzing a first interface of the application using the application crawler;
storing a first command in a first position in a stack and a second command in a second position in the stack;
providing the first command to select a first user interaction element on the first interface of the application using the application crawler, wherein the first user interaction element was found during the analyzing of the first interface of the application;
analyzing a second interface of the application using the application crawler, wherein the second interface was presented by the application in response to the first command; and
storing the first command and a third command as a sequence in the stack, wherein the third command is for a second user interaction element, wherein the second user interaction element was found during the analyzing of the second interface of the application, and whereby: (i) the stack stores the sequence and the second command; and (ii) the sequence antecedes the second command in the stack.

22. The method of claim 21, further comprising:
popping the first command off the first position in the stack prior to providing the first command to select the first user interaction element on the first interface;
wherein the step of storing the first command in the first position in the stack, and the second command in the second position in the stack includes two consecutive steps of: (i) pushing the second command onto the stack; and (ii) pushing the first command onto the stack.

23. The method of claim 21, further comprising:
popping the sequence off the first position in the stack;
providing the sequence to the application using a user interface UI command entry automator;
analyzing a third interface of the application using the application crawler, wherein the third interface of the application was presented by the application in response to the sequence.

24. The method of claim 21, wherein:
the first user interface elements and the second user interface elements are widgets;
the application crawler has direct access to parse a front end portion of application; and
analyzing the application interface to find the set of user interface elements includes parsing the front end portion of the application using the UiSelector class.

25. The method of claim 21, wherein:
the application source code includes a manifest;
the application crawler does not have access to the manifest or the source code; and
the application crawler has direct access to only one screen of the application at a time.

* * * * *